Sept. 4, 1923.
P. COTTRINGER
1,466,991
PROCESS FOR MAKING PHENOL
Filed April 25, 1918
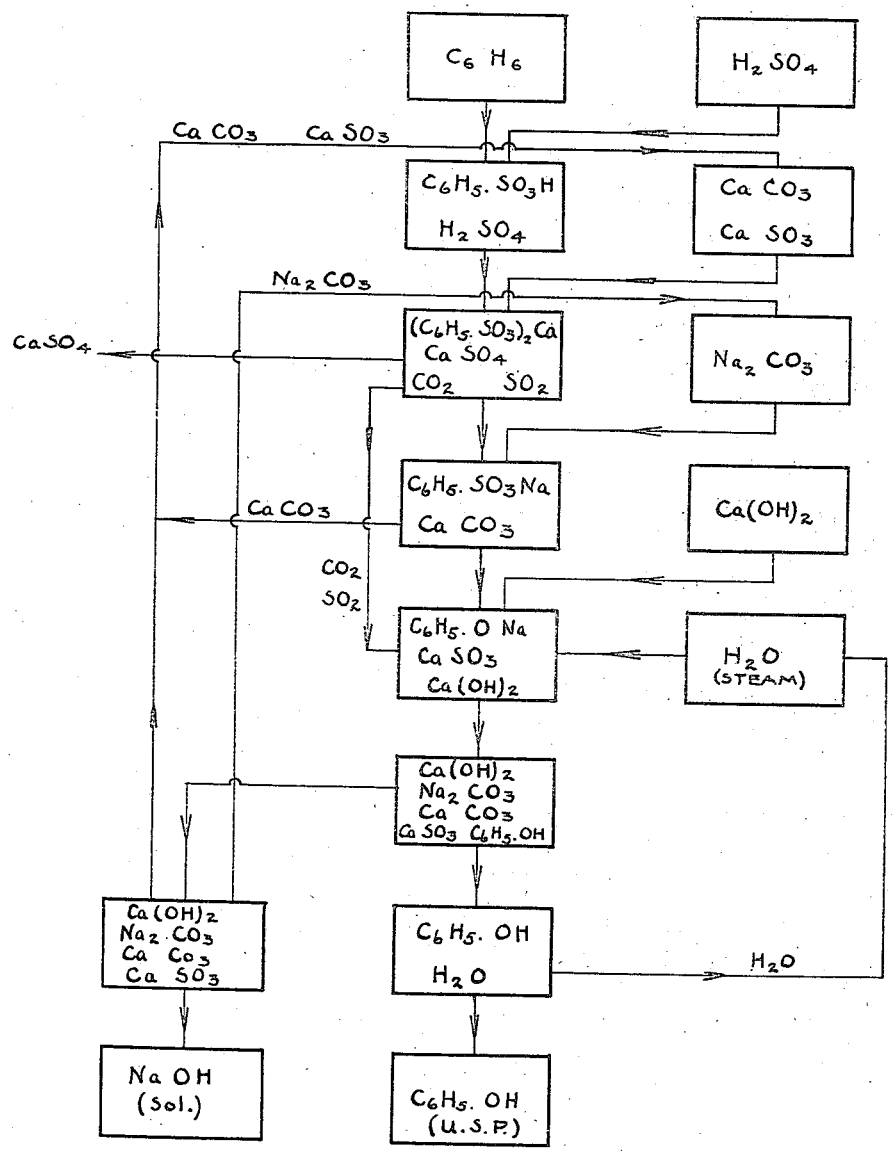
INVENTOR
Paul Cottringer.
By
ATTORNEYS Patented Sept. 4, 1923.

1,466,991

UNITED STATES PATENT OFFICE.

PAUL COTTRINGER, OF MIDLAND, MICHIGAN, ASSIGNOR TO THE DOW CHEMICAL COMPANY, OF MIDLAND, MICHIGAN, A CORPORATION OF MICHIGAN.

PROCESS FOR MAKING PHENOL.

Application filed April 25, 1918. Serial No. 230,641.

*To all whom it may concern:*

Be it known that I, PAUL COTTRINGER, a citizen of the United States, and a resident of Midland, county of Midland, and State of Michigan, have invented a new and useful Improvement in Processes for Making Phenol, of which the following is a specification, the principle of the invention being herein explained and the best mode in which I have contemplated applying that principle, so as to distinguish it from other inventions.

The present improvements have more particular regard to the method of decomposing the phenate and the subsequent recovery of the liberated phenol. One object of the invention accordingly is to provide for the instantaneous removal of the phenol as fast as it is formed from the corresponding phenate. A further object of the invention is to render possible the use of lime instead of caustic soda in the fusion stage where the phenate is synthetically prepared, instead of being derived from the carbolic acid fraction in coal tar distillation.

To the accomplishment of the foregoing and related ends the invention then consists of the steps hereinafter fully described and particularly pointed out in the claims. The annexed drawing and the following description set forth one series of steps for carrying out my improved process, but it will be understood that such steps are merely illustrative of various ways in which the principle of the invention may be utilized.

In said annexed drawing:—

The single figure there appearing illustrates in diagrammatic or chart-form, the succession of steps involved in carrying out my process.

Assuming the process to be a synthetic one throughout, calcium benzene-sulphonate is first made in the usual way, i. e., by neutralizing a mixture of sulphuric and benzene-sulphonic acids by calcium sulphite or carbonate, with the formation of calcium sulphate, calcium benzene-sulphonate, carbon dioxide or sulphur dioxide or both, and water, and if desired, the calcium benzene-sulphonate may be converted to the corresponding sodium salt by treating with sodium carbonate or sulphite.

After obtaining the dry sodium or calcium benzene sulphonate hereinafter referred to simply as sulphonate, it is placed together with from four to seven equivalents of slaked lime in a gas-tight rotating drum or cylinder, and the temperature brought up to between 425° C. and 500° C. by external heat applied to such drum. The temperature will have to be considerably higher where the calcium sulphonate is used instead of sodium sulphonate.

After the temperature of the mixture has been maintained for a short time as described, a current of steam and sulphur dioxide or carbon dioxide, or else a mixture of all three, is forced through the drum, the interior of which is obviously at a temperature high enough to maintain the steam in a vaporous state.

After passing through the drum the vapor is condensed and the condensate collected in a suitable receptacle. Such condensate will consist of two layers, the upper being a saturated solution of phenol and water, while the lower heavier layer is a solution of water, diphenyl oxide, diphenylene oxide and higher boiling compounds, in phenol. The upper or watery solution of phenol is pumped off and boiled, to provide the steam that is mixed with a suitable dioxide in the decomposition step, while the lower heavier layer is distilled in the usual way, the first portion of the distillate being put back into the receiver of the drum, and the final portion being U. S. P. phenol.

The residue in the drum after the reaction between the lime and sulphonate and the decomposition of the resulting calcium phenate has been completed, may be leached out and will give nearly an equivalency of sodium hydroxide. The residue from this leach can then be used to neutralize the sulphuric and benzene-sulphonic acid mixture to make more sulphonate for use in the first step of the general process.

While, in the foregoing description, the phenol more especially referred to is hydroxy-benzene, ordinarily known as carbolic acid ($C_6H_5.OH$), it is to be understood that this is not by way of limitation, but that the several steps of my improved process are also adaptable to the homologues of such phenol, and irrespective of whether it is the mono-, or polyhydroxy derivative that is sought.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of making phenol, the steps which consist in decomposing with a current of steam and dioxide gas capable of reacting with a phenate a phenate corresponding with the phenol desired, so as to free such phenol; and removing and condensing the resulting vapor as fast as such phenol is formed.

2. In a method of making phenol, wherein a mixture of lime and a sulphonate of the hydrocarbon corresponding with the phenol desired is heated and the corresponding phenate thereby formed; the steps which consist in passing a current of steam and a dioxide gas capable of reacting with a phenate across such mixture to decompose such phenate and remove the resulting phenol as fast as it is formed; and condensing the resulting vapor and separating the phenol therefrom.

3. In a method of making phenol, the steps which consist in subjecting calcium phenate to a current of steam and a dioxide gas capable of reacting with a phenate to free the phenol; and removing and condensing the resulting vapor as fast as such phenol is formed.

4. In a method of making phenol, wherein a mixture of a benzene-sulphonate and lime is heated and calcium phenate thereby formed; the steps which consist in passing across such mixture a current of steam and a dioxide gas capable of reacting with a phenate to decompose such phenate and free the phenol, whereby such freed phenol is removed from the other products of such decomposition as fast as it is formed; and condensing the resulting vapor and separating the phenol therefrom.

5. In a method of making phenol, wherein a mixture of a benzene-sulphonate and lime is heated and calcium phenate thereby formed; the steps which consist in passing across such mixture a current comprising steam and carbon dioxide adapted to decompose such phenate and free the phenol, whereby such freed phenol is removed from the other products of such decomposition as fast as it is formed; and condensing the resulting vapor and separating the phenol therefrom.

6. In a method of making phenol, wherein a mixture of a benzene-sulphonate and lime is heated and calcium phenate thereby formed; the steps which consist in passing a current of steam and carbon and sulphur dioxides across such mixture to decompose such phenate and remove the resulting phenol as fast as it is formed; and condensing the resulting vapor and separating the phenol therefrom.

Signed by me, this 19th day of April, 1918.

PAUL COTTRINGER.